United States Patent [19] [11] 4,137,835
Petersen [45] Feb. 6, 1979

[54] OSCILLATORY FOOD WARMING APPARATUS

[76] Inventor: Ross K. Petersen, 2974 W. River Rd., Minneapolis, Minn. 55406

[21] Appl. No.: 761,065

[22] Filed: Jan. 21, 1977

[51] Int. Cl.² .......... A47J 27/10; A23L 3/10; A47J 36/24
[52] U.S. Cl. .......... 99/348; 99/371; 366/210
[58] Field of Search .......... 99/371, 348, 409, 323.5, 99/359-361, 367-369; 259/73, 75, DIG. 23, DIG. 38; 366/210, 213

[56] References Cited

U.S. PATENT DOCUMENTS

| 1,681,404 | 8/1928 | Hardman | 259/75 |
| 1,975,073 | 10/1934 | Chapman | 99/371 |
| 2,447,240 | 8/1948 | Eisler | 99/367 |
| 2,894,309 | 7/1959 | Brzowski | 259/DIG. 38 |
| 3,635,150 | 1/1972 | Piedallu | 99/348 |

FOREIGN PATENT DOCUMENTS 985833 1951 France .......... 99/409

Primary Examiner—Harvey C. Hornsby
Assistant Examiner—Timothy F. Simone
Attorney, Agent, or Firm—Burd, Braddock & Bartz

[57] ABSTRACT

An oscillatory food warmer simultaneously warms and mixes food while it remains within a sealed can. The warmer includes a housing having an inner wall which defines a chamber for storing water. A heating element is mounted in the housing whereby the temperature of the water may be controlled. A cover supported on the housing closes the top of the chamber. Supports on the cover hold a conventional sealed food container in the water. The sealed can is submerged in the water and supported between two rotatable discs, each frictionally engaging one end of the can. An electric motor rotates a crank shaft, and means are provided to translate rotational motion of the shaft to oscillatory motion in the discs. Quick release structure is provided to facilitate removal of the can from between the discs. A food warming method includes supporting the can substantially submerged in water, heating the water to a preselected temperature, and rotationally oscillating the can.

15 Claims, 6 Drawing Figures

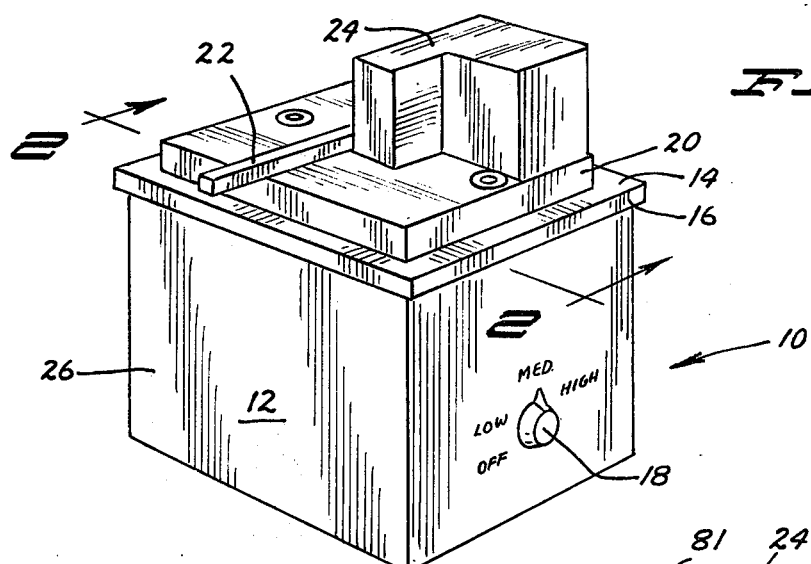
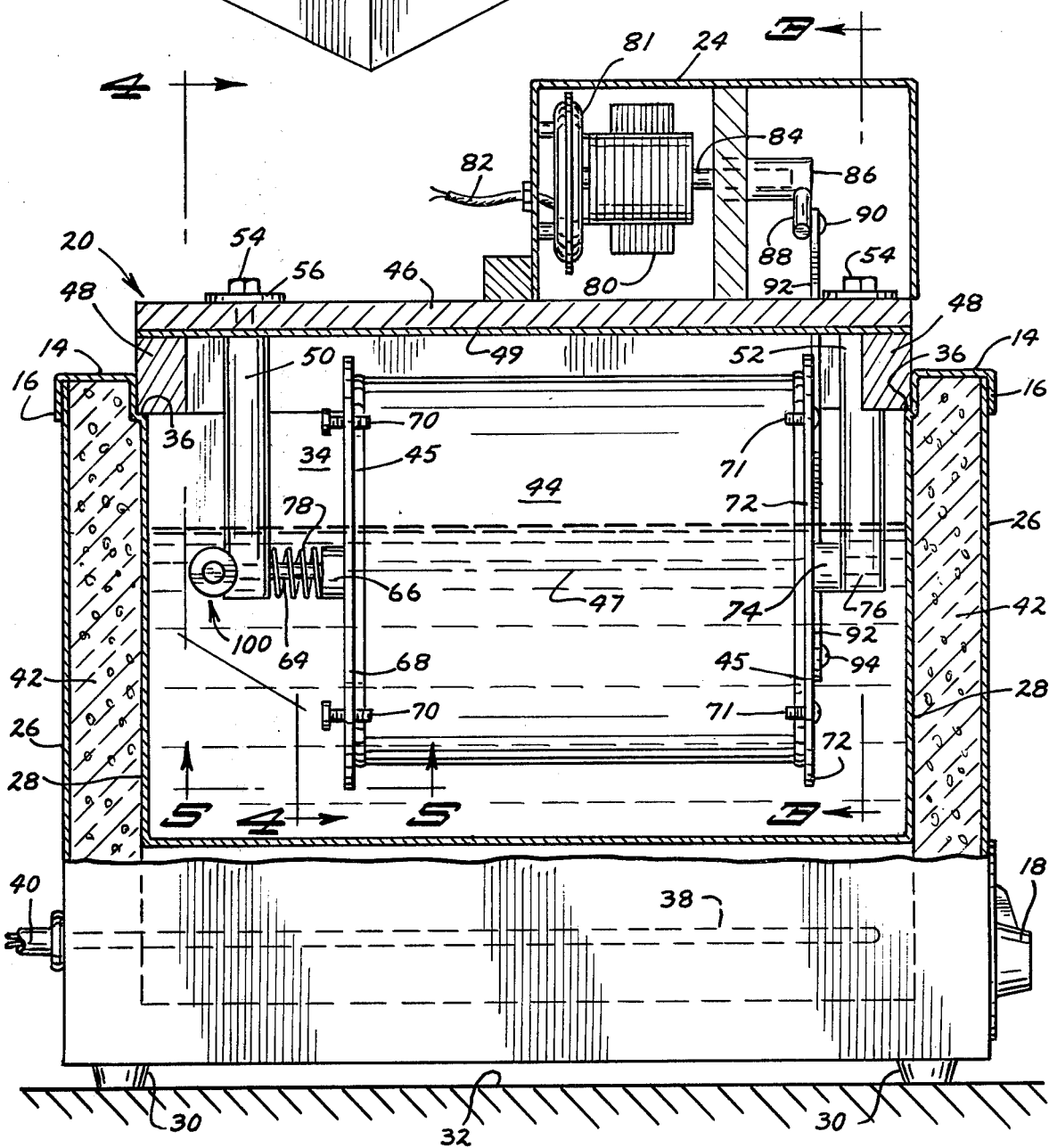

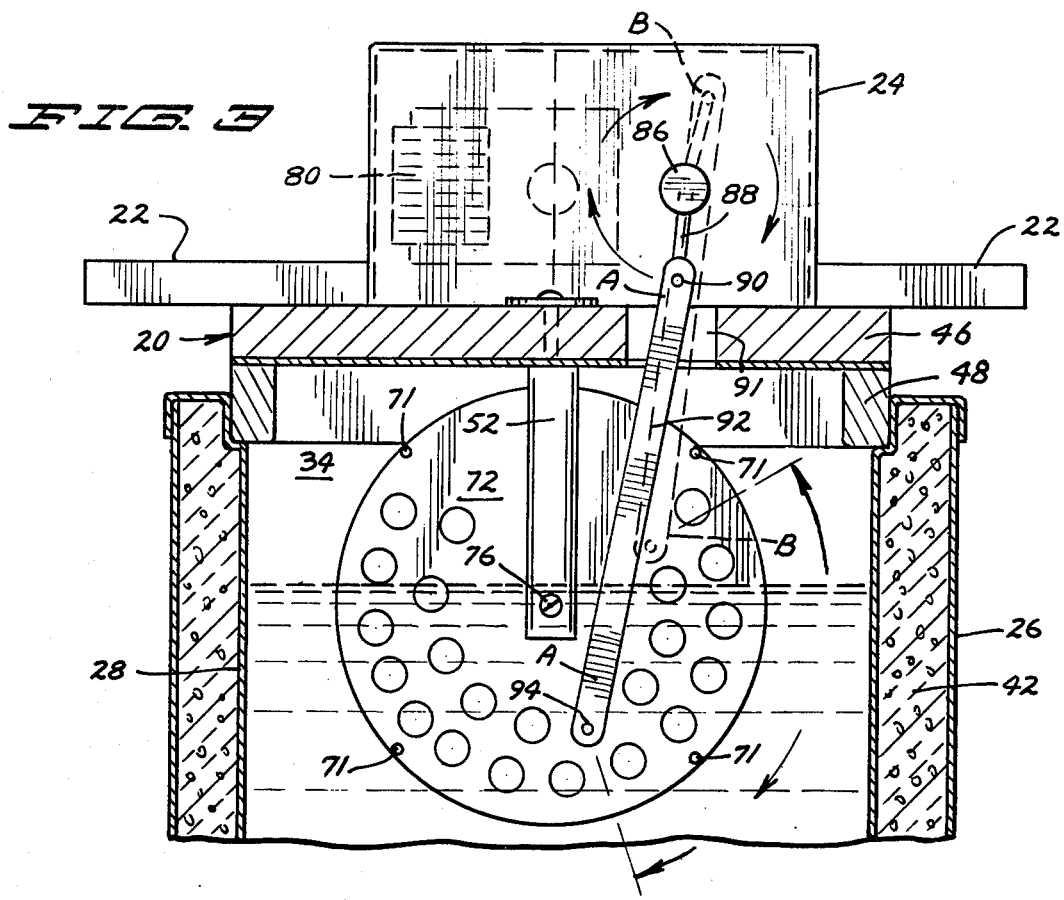
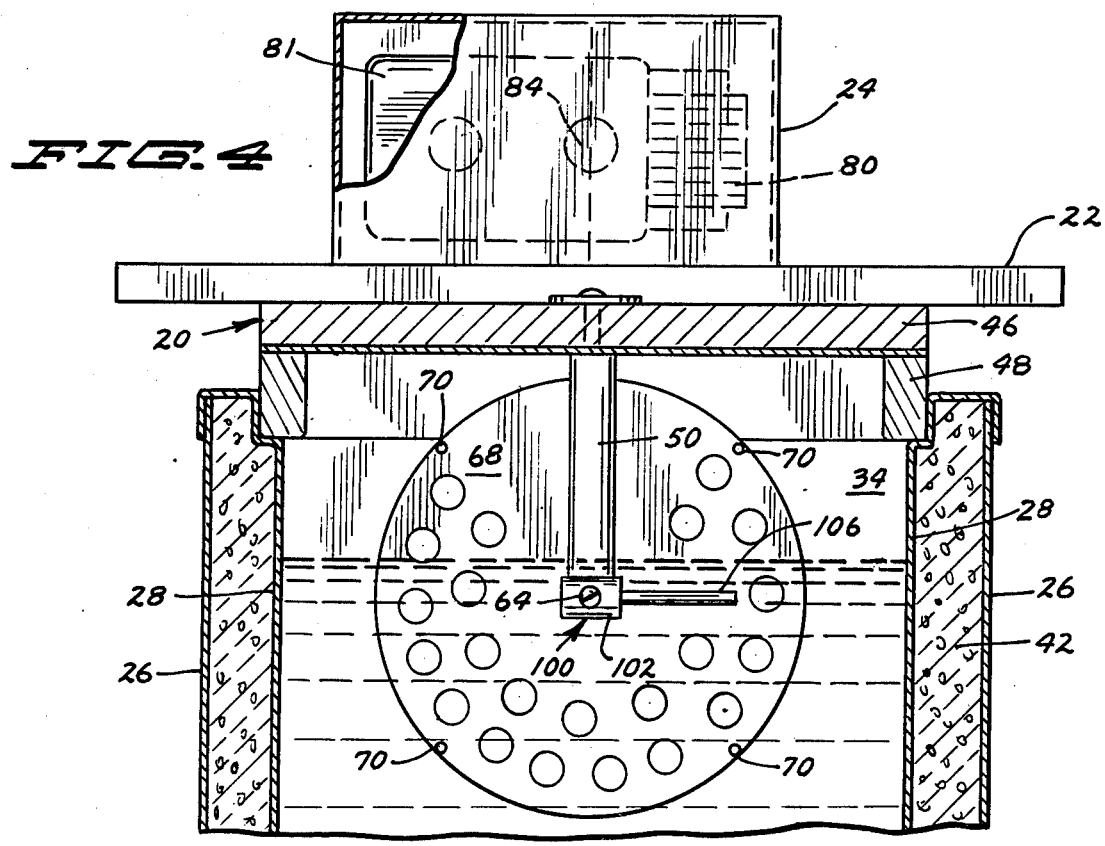

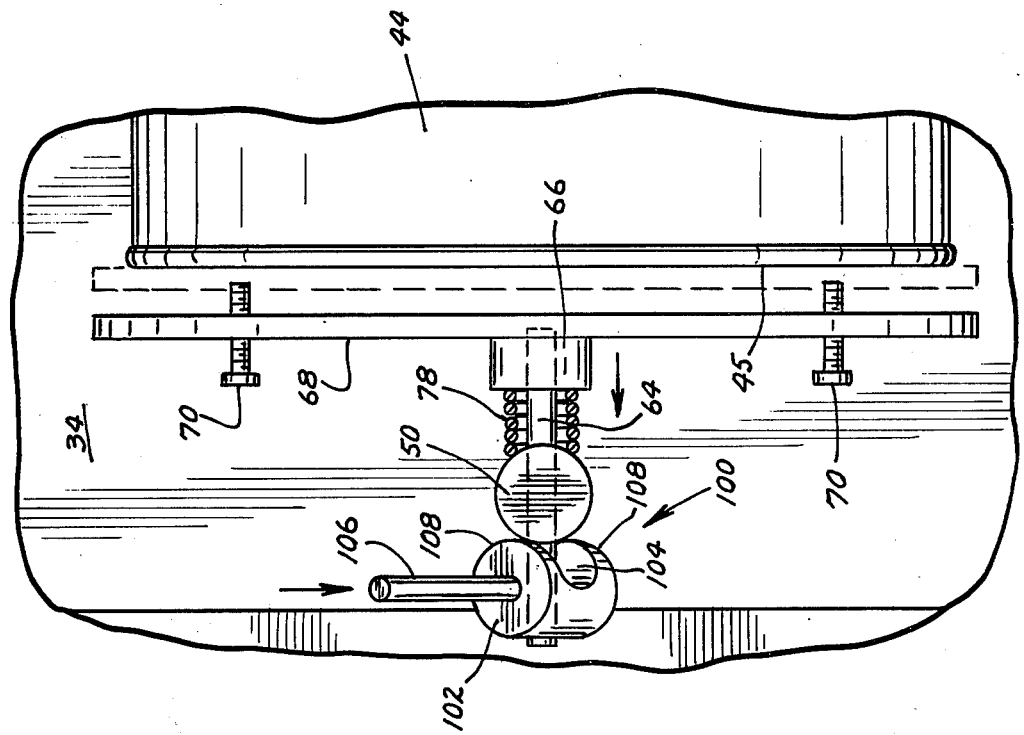
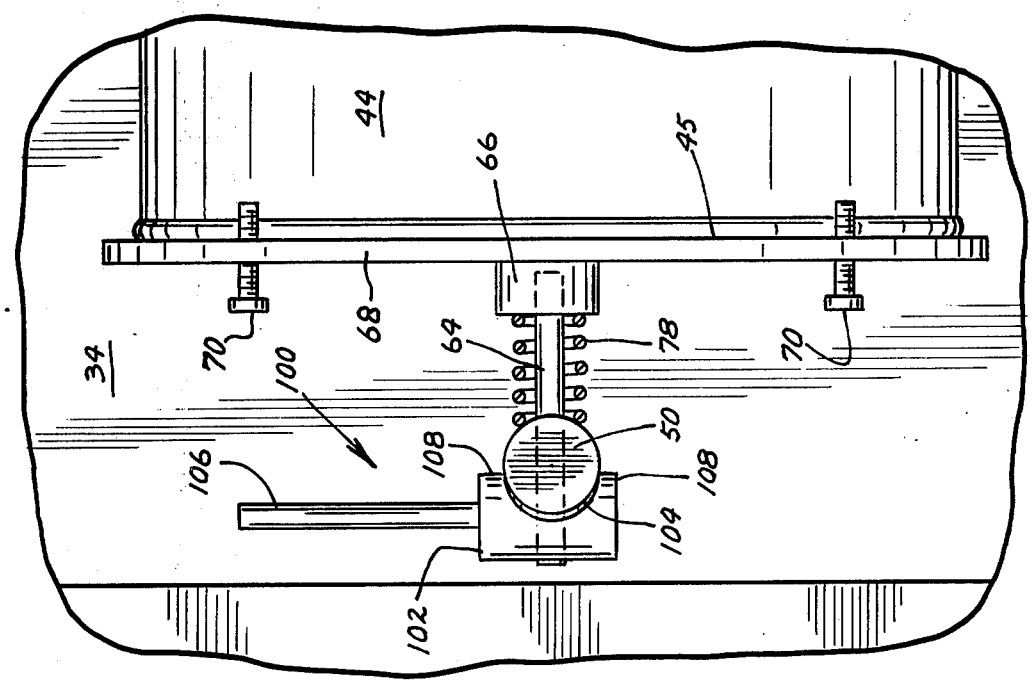

OSCILLATORY FOOD WARMING APPARATUS

BACKGROUND OF THE INVENTION

One of the principal challenges in operating a restaurant is to provide rapid and high volume service to customers, yet minimize waste of food. Efficient use of time, space and energy are vitally important to success. Present methods of restaurant food preparation include prior preparation, then the placement of the prepared food under infra-red lamps or other sources of radiant heat to maintain the food at the desired temperature. Another method involves the use of a food warmer, most often a rectangular tank open at the top, with an inside chamber and a heating element mounted in the tank for heating water located in the chamber. Food can be placed directly in the chamber. When water is used, food is placed in trays or bowls resting at the top of the tank and extending downward into the chamber. Food in the trays or bowls is heated mainly due to conduction.

In the above methods, canned food is removed from the can prior to heating. This results in waste for a number of reasons. Settling and separation of some foods while stored in tin cans causes an unsightly deposit inside the can which is often discarded though it may be as nutritious as the remainder of food in the can. In other cases, properly mixed food nonetheless adheres in part to the can inside surface and is discarded along with the can. Most waste probably results from the practice in restaurants of removing the food from the can prior to heating. Frequently partially or totally unused food must be discarded since the can has been opened. The temptation to save and use such food, despite regulations and ordinances to the contrary, potentially worsens sanitary conditions in the restaurant.

SUMMARY OF THE INVENTION

The invention relates to an apparatus for warming and agitating the contents of a closed container. The embodiment described is particularly well suited for use with food contained in metal cans of the standard "No. 10" size. Such cans are cylindrical in shape and measure approximately 18 cm in length and 15½ cm in diameter. Each can has two opposed generally flat and circular end portions and is disposed about an axis which passes through the center of each end portion. The apparatus disclosed includes a housing with an inner wall. The inner wall defines a chamber capable of supporting and containing a fluid, for example, water. A heating element which can be mounted in the housing provides the heat necessary to warm the fluid. The heating element can be electric and therefore susceptible to control through a rheostat.

The top of the housing is closed with a cover. Support or holding means attached to the cover are provided for releasably supporting the can in the chamber at least partially submerged in the fluid. The can is supported so that the axis is substantially horizontal. The support means include two circular and generally flat discs, one frictionally engaging each end of the can whereby the can is supported between the two discs.

Oscillatory means mounted on the cover operate to rotationally oscillate the container about its longitudinal axis. The oscillatory means includes a crank shaft driven in continuous rotary motion by an electric motor, and linkage including a crank arm and follower which translate the rotational motion of the crank shaft into oscillatory motion of the discs.

Since the oscillatory food warmer is adapted to accommodate the No. 10 can, there is no need for a separate container for the preparation of food contained in the can. The food is warmed, agitated and thoroughly mixed while it remains sealed in the can. This results in reduction of wasted food, first of all because the food is thoroughly mixed. Consequently there is no food residue which might be discarded. Furthermore, the agitation causes movement of the food within the can which dislodges food clinging to the can inside surface, whether or not as a result of the food settling. The agitation and mixing of the food facilitates even heating throughout the contents of the can. Finally, since the can remains sealed as it is warmed and is not opened until used, preheated but unused food simply remains in the can. There is no need to dispose of it.

Elimination of the need for separate serving containers offers additional advantages. First of all, sanitation is increased since the same amount of food can be served using fewer containers. The food warmer and agitator remain clean since the food remains sealed in the can and only water is supported in the chamber.

The apparatus enhances the efficient use of time, space and available energy. Food heats more quickly since it is mixed while warmed. Eliminated along with the unnecessary containers is the time involved in handling and cleaning them. Reducing the number of containers to be cleaned of course reduces expenditure of energy. Valuable space not used in storing of the unneeded containers is made available for other use. Furthermore, since the apparatus presents one unit for warming and agitating food, separate appliances for the two purposes are unnecessary.

The holding structure for the food can and the drive mechanism including the electric motor are all attached to a cover. The cover is supported on the housing and closes the top of the housing. Conventional heating tanks or housings can be used with the cover and structure mounted thereon. The cover can be readily removed from the housing so that the food container can be released from the holding structure.

IN THE DRAWINGS

FIG. 1 is a perspective view of a food agitator and warmer in accordance with the invention;

FIG. 2 is an enlarged cross sectional view taken along the line 2—2 in FIG. 1;

FIG. 3 is a sectional view taken along the line 3—3 in FIG. 2;

FIG. 4 is a sectional view taken along the line 4—4 in FIG. 2;

FIG. 5 is a further enlarged sectional view taken along the line 5—5 in FIG. 2 showing a quick release means of the agitator and warmer in the closed position; and FIG. 6 is an enlarged cross sectional view taken along line 5—5 in FIG. 2 showing the quick release means in the open position.

DESCRIPTION OF THE PREFERRED EMBODIMENT

Referring to the drawings, there is shown at 10 an oscillatory food warming apparatus constructed according to the invention. Apparatus 10 includes a rectangular housing or open top box 12 which can be formed of rigid and heat resistant materials such as sheet metal, certain plastics, and the like. The top of housing 12 has a generally horizontal upper surface 14. A flange 16 depends downwardly from the outside of upper surface 14.

Mounted to the outside of housing 12 is a temperature control dial 18. Dial 18 is operably associated with heating means mounted in the housing, for example, an electric heating element 38. While discrete settings of "low", "medium" and "high" are shown, it is preferred that these indicate ranges only and that dial 18 be infinitely variable between the "off" position and the highest setting. While electric heating means are shown, other temperature control means are contemplated as within the scope of invention, for example, cooling coils through which freon or another refrigerant could be circulated.

A cover or base 20 is supported at the top of housing 12 inwardly of upper surface 14 and closes the open top of housing 12. Base 20 is readily removed from housing 12 merely by lifting, as facilitated by a carrying handle 22 rigidly attached to base 20. A motor housing 24 also is attached to the top of base 20.

In FIG. 2, it is seen that housing 12 includes an outer wall 26 and an inner wall 28. Inner wall 28 is preferably highly thermally conductive. The inside corners of inner wall 28 may be rounded to facilitate cleaning. Walls 26 and 28 can be sheet metal, plastic, or any other rigid material substantially resistant to large variations in temperature. Feet 30 are attached to the bottom portion of outer wall 26 and support housing 12 with respect to a supporting surface 32.

Inner wall 28 defines in housing 12 a generally rectangular chamber 34. Near the top of chamber 34, inner wall 28 is bent to provide a substantially horizontal shelf 36, bent once again to provide a generally vertical portion, bent a third time to form upper surface 14, and finally bent downwardly to provide flange 16 which is attached to the upper portion of outer wall 26 by welding, an adhesive, or other known means. Cover 20 rests on shelf 36 and fits into the top of wall 28.

An electric heating element 38 extends into housing 12 through wall 26 and is located under chamber 34. A line 40 joins heating element 38 to a source of electric power, not shown. Heating element 38 is also operatively connected to temperature control dial 18 by means well known and not herein described. Dial 18 functions as a rheostat to vary the amount of current through heating element 38 and thereby vary the amount of heat produced in heating element 38. Insulation 42 is mounted between walls 26 and 28. Insulation 42 can be glass, expanded foam, or any other suitable material with low thermal conductivity. Due to insulation 42, a greater percentage of heat produced in electric heating element 38 remains within housing 12. Housing 12 is a food warmer used for many years to heat foods in open containers. An example of this food warmer is the Dual Food Warmer Model SS 260 made by the Medalie Manufacturing Co., Minneapolis, Minnesota.

A food containing metal can or container 44 is maintained in chamber 34. Can 44 is a sealed food container of tin, aluminum, or the like. Can 44 is cylindrical in shape and is the standard "No. 10" size, having an axial length of approximately 18 cm and a circular diameter of approximately 15½ cm. Can 44 has two opposed generally flat and circular end portions. Each end portion includes a flat circular end surface surrounded by an annular ridge, the annular ridge having an annular surface 45 axially outward of the end surface. Can 44 is substantially symmetrically disposed about a central longitudinal axis 47 which passes through the center of each end portion.

The food containing metal can 44 is maintained in chamber 34 by a support means including base 20. Base 20 has a generally flat and horizontal top member 46 and an inner sheet metal member 49. Side walls 48 are mounted with respect to the outward portions of top member 46 and depend downwardly therefrom. Side walls 48 rest upon shelf 36 and are biased against shelf 36 simply due to gravity. The upper portion of inner wall 28 prevents lateral movement of side walls 48 with respect to housing 12. In this manner, base 20 is firmly fixed with respect to housing 12, yet is easily removed from housing 12 by lifting.

Can holding means comprising a first standard 50 and a second standard 52 depend downwardly from top member 46. Each standard is fixed with respect to top member 46 by a bolt or screw 54 having a threaded portion contacting each standard and a head portion bearing against a washer 56 at top member 46.

A first axle 64 is supported rotatably and with respect to first support standard 50 and is linearly aligned with central longitudinal axis 47 of can 44. Axle 64 is also linearly movable with respect to first standard 50 in the direction of the axis. A first bearing 66 surrounds first axle 64 and is rotatably mounted with respect thereto. No longitudinal linear movement between first bearing 66 and first axle 64 is permitted, however. First bearing 66 is fixed to a first support disc 68. First support disc 68 is adapted to frictionally engage one of the annular surfaces 45 of can 44. Retaining screws 70 are inserted through apertures proximate the outer edge of first support disc 68 and restrain can 44 against linear movement in directions perpendicular to axis 47.

A second support disc 72 is adapted to frictionally engage the opposing annular surface 45 of metal can 44. Second disc 72 is supported against can 44 through a second bearing 74 and a second axle 76. Second bearing 74 is fixed to disc 72, while second axle 76 is fixed to second standard 52. Second axle 76 and second bearing 74 are rotatable relative to one another. Like first axle 64, second axle 76 is linearly aligned with central longitudinal axis 47. A plurality of retaining screws 71 are mounted through openings proximate to the edge of second support disc 72, screws 71 preventing movement of can 44 relative to second disc 72 in directions perpendicular to the central longitudinal axis.

A coiled spring 78, in compression between first standard 50 and first bearing 66, continuously biases first support disc 68 away from first standard 50 and toward metal can 44. This necessarily forces can 44 toward second supporting disc 72. In this manner, the can 44 is firmly maintained between support discs 68 and 72. With can 44 so maintained, central axis 47 is substantially horizontal.

Chamber 34 is somewhat more than half filled with a fluid, preferably water. As indicated by the shading in FIG. 2, chamber 34 is filled to provide a fluid level slightly above bearings 66 and 74, although any fluid level offering substantial communication between the fluid and metal can 44 is satisfactory. The temperature of metal can 44 is controlled by heating the fluid with electric element 38. The fluid then transmits heat directly to can 44. Support discs 68 and 72 are perforated to facilitate heat transfer between the fluid and the ends of metal can 44. This is most clearly seen in FIGS. 3 and 4, as is the arrangement of retaining screws 70 and 71 at each support disc periphery.

Returning to FIG. 2, motor housing 24 is mounted at the top of member 46 of base 20. An electric motor 80 is supported in motor housing 24. A line 82 connects electric motor 80 to an electrical power supply, not shown. A drive shaft 84 is drivably connected to electric motor 80. The connection is through a stepped down gear box or power transmission 81, so that a high number of revolutions in the electric motor 80 produces only one revolution of shaft 84. A cap 86 is fixed to the end of shaft 84. A linkage drivably connects shaft 84 with disc 72 to transmit arcuate motion to disc 72 which rotates can 44 less than 360°. As shown in FIG. 3, the linkage includes cap 86 and a crank arm 88 rigidly mounted to cap 86 and extending radially outward therefrom. A first pivot pin 90 pivotally connects an elongate follower 92 to the radially outward end of crank arm 88. Follower 92 extends downwardly through a hole 91 in base 20 adjacent disc 72. A second pivot pin 94 pivotally mounts the opposing end of follower 92 to second support disc 72.

The linkage between crank shaft 84 and second support disc 72 is most clearly illustrated in FIG. 3. Solid lines indicate a first position A of follower 92, crank arm 88, and pivot pins 90 and 94, while the dotted lines indicate a second position B of the same members. As indicated by the arrows around crank shaft 84, crank arm 88 and first pivot pin 90 follow a path of uni-directional rotation about an axis at the center of crank shaft 84 and cap 86. As indicated by the arrows near disc 72, however, the path of motion for second pivot pin 94 and second support disc 72 is oscillatory and rotational about central longitudinal axis 47 of can 44.

Follower 92 is connected through both pivot pins 90 and 94 and thereby provides the direct connection between the oscillatory motion and uni-directional rotational motion. As crank arm 88 and first pivot pin 90 rotate clockwise, as shown in FIG. 3, from position A to position B, the follower 92 is likewise carried at its upper end in the clockwise direction. The opposite end of follower 92 carries second pivot pin 94 and second support disc 72 in the counter-clockwise direction to second position B. As crank arm 88 and first pivot pin 90 continue the clockwise rotation and travel from position B to position A, the upper end of follower 92 follows this rotational motion. The opposite end of follower 92 moves generally downward along with its upper end. However, due to the location of the rotational center at second axle 76, counter-clockwise rotation of second disc 72 is no longer possible. Instead, the second pivot pin 94 and disc 72 are momentarily halted, then rotated in the clockwise direction, whereupon they return from position B to position A along the identical path as was traveled from position A to position B. Similarly, as crank arm 88 and first pivot pin 90 continue to rotate from position A to position B and follower 92 begins its upward movement, the location of second axle 76 prevents continuation of the clockwise rotation in second disc 72 and second pivot pin 94. These are momentarily halted, then rotated again in the counter-clockwise direction. In this manner, an oscillatory means is provided wherein uni-directional rotation of crank shaft 84 is translated to oscillatory motion in second support disc 72. Due to the frictional engagement between second disc 72 and metal can 44, the oscillatory motion is necessarily transferred to can 44.

As indicated in FIG. 3, second disc 72 is limited to an oscillatory path of slightly more than 90° rotation.

Insertion of metal can 44 between support discs 68 and 72, as well as removal of can 44 therefrom, is facilitated by a quick release mechanism indicated generally at 100, shown in FIGS. 4–6. Release mechanism 100 includes a dog 102, generally cylindrical in shape except for a concave cylindrical groove indicated at 104. Groove 104 is adapted to accommodate the outer surface of first standard 50 most remote from can 44. Dog 102 is rigidly attached to first axle 64. A handle 106 is attached to dog 102 and extends therefrom in a direction generally perpendicular to first axle 64.

Quick release mechanism 100 is adaptable to assume a closed position in which the support discs 68 and 72 are held in firmly clamping contact with metal can 44, and an open position in which first support disc 68 is retracted from can 44 to allow facile removal of the same from chamber 34. The closed and open positions are illustrated in FIGS. 5 and 6, respectively.

In the closed position, first support disc 68 is pressed firmly against one of the annular surfaces 45 of metal can 44. First standard 50 is substantially accommodated in cylindrical groove 104 of dog 102. Coil spring 78 is under moderate compression, one end bearing upon first standard 50 while the other presses against first bearing 66.

FIG. 6 shows the open position in which first support disc 68 is removed from annular surface 45. In moving from the closed or clamped position of FIG. 5 to the open position, handle 106 is simply rotated about the center of first axle 64. Handle 106 has been rotated according to the arrow, although it could have been moved in the opposite direction to accomplish the same result. Such rotation removes groove 104 from face-to-face engagement with first standard 50, and forces lugs 108 at either side of groove 104 into surface engagement with first standard 50. As first standard 50 is anchored to base 20, the forced surface contact necessarily causes dog 102 to move with respect to base 20 away from can 44 in the direction of central longitudinal axis 47. First axle 64, rigidly attached to dog 102, follows dog 102 linearly and also rotates in the direction of dog 102 with respect to first standard 50. First axle 64 is rotatably mounted with respect to first support disc 68, but is anchored with respect to disc 68 to prevent relative movement between axle 64 and disc 68 in the direction of central axis 47. Consequently the movement in dog 102 produces little if any rotation in disc 68. However, disc 68 is moved linearly in the direction of longitudinal axis 47 a sufficient amount not only to remove disc 68 from the annular ridge of can 44, but to clear can 44 of retaining screws 70 as well.

First bearing 66 and first standard 50 are necessarily closer to one another in the open position, producing greater compression in coil spring 78. Consequently, when dog 102 is rotated from the open position a sufficient distance toward the closed position, the friction between lugs 108 and first standard 50 is overcome and the dog 102 tends to snap back into a totally closed position. Thus, the apparatus may be quickly unloaded and reloaded, and a positive clamping action on the replacement can is guaranteed.

While a specific oscillatory arrangement is described, it is noted that the speed of the electric motor could be varied if desired to vary the rate of oscillation of can 44. Further, the position of second pivot pin 94 could be varied to change the amplitude of oscillation. For example, if the pivot pin 94 were moved radially outward from second axle 76, a reduced amplitude would result. Likewise, amplitude would be increased if pivot pin 94 were situated nearer to second axle 76.

Apparatus 10 is well suited for practice of an oscillatory food warming method which significantly reduces the time required for heating food contained in a standard No. 10 can such as metal can 44. While this method is described in sequential steps, it is understood that the invention encompasses more than a given particular order of steps, and that in practice it is desirable that two or more of the steps occur simultaneously.

It is necessary first to insert a No. 10 can between discs 68 and 72. Since discs 68 and 72 are rotationally mounted with respect to standards 50 and 52, which in turn are attached to base 20, the cover 20 is removed from housing 12 to facilitate loading. Loading is accomplished merely by rotating handle 106 to force dog 102 into the open position, inserting the No. 10 can between the discs, then rotating the lever to force dog 102 into the closed position once again. Discs 68 and 72 then frictionally engage the No. 10 can and hold it firmly in place. Retaining screws 70 and 71 provide additional restraint against movement of the can.

Cover 20 is then placed upon upper surface 14 so that the discs and can are supported inside chamber 34. Chamber 34 is filled with a fluid in sufficient amount so that the can is more than half submerged in the fluid. Water is most satisfactory as a fluid due to its non-toxicity and low cost. With the can submerged, the water is heated to a temperature ranging from 90° to 96° C. This temperature range is particularly well suited for heating a can of chili, for example, as it warms the chili to an eventual temperature of approximately 71° C. For canned foods other than chili in which different temperature ranges may be optimal, the water temperature is adjustable through temperature control dial 18 to change the amount of current passing through electric heating element 38. Thus the warming process is adjustable to suit a variety of foods.

Agitation occurs during the warming process. Electric motor 80 is activated to revolve crank shaft 84. The linkage translates the rotational motion of crank shaft 84 into oscillatory motion in second support disc 72. As the can is frictionally supported between support discs 68 and 72, the can oscillates as well. There is a tendency in food close to the can inside surface to follow the can as it rotates. This tendency is more pronounced in foods having relatively high viscosities. There is a countervailing tendency in the food to seek a level upper surface. Together these tendencies create a rolling action which thoroughly mixes the food. This reduces the time necessary for heating the food, since heat is transmitted in the food by conduction and convection, rather than by conduction alone. Furthermore, the mixing counteracts the settling due to long term storage of food in the can. Unsightly deposits from settling are mixed with the remainder of the food and therefore eliminated. This reduces food waste from the practice of discarding deposits in spite of their nutritional value. The rolling or mixing action further serves to dislodge food particles adhering to the can inside surfaces.

After a sufficient amount of time in apparatus 10, the food is thoroughly warmed and mixed and ready for immediate serving. The can containing the warmed and mixed food is removed from chamber 34 merely by lifting base 20 from housing 12 and removing it to a counter or other convenient surface. Lever 106 of quick release mechanism 100 is rotated to bias dog 102 into the open position. This frees the can for use in serving, and renders the support means ready to receive a second No. 10 can for heating and mixing. There is no need to clean apparatus 10 between separate uses since each No. 10 can remains sealed until removed from the apparatus.

An oscillatory food warmer in accordance with the invention disclosed substantially reduces the amount of wasted food. While the can is being heated, the food is agitated and thoroughly mixed, eliminating the waste resulting from settling which often occurs during storage of food in cans. Further, food particles adhering to the can inside walls are removed therefrom and mixed with the remainder of the can contents. Perhaps the most substantial food savings occur in restaurants, where food can remain in the sealed can yet be sufficiently warm for instantaneous use. Since the can is never opened until the food is to be used, food unused at the end of the day may be preserved for use at a future date rather than discarded as is now common practice.

Since food is heated while contained in the original sealed metal can, the need for separate containers in the preparation of canned foods is eliminated. Reduction in the number of separate containers for the food on its way from proprietor to customer necessarily reduces the probability of food contamination due to an unsanitary container, and therefore results in a generally more sanitary restaurant operation. Eliminated along with the need for extra containers is the requirement to handle these containers and later clean them, and thus much valuable time is saved. The amount of energy required to clean the extra containers adds to the savings.

Space, often at a premium in restaurant kitchens as well as household kitchens, is saved since fewer containers are needed to prepare the same amount of food. Furthermore, separate units to warm the food and mix or agitate the food are replaced by a single unit which performs both tasks simultaneously.

The embodiments of the invention in which an exclusive property or privilege is claimed are defined as follows:

1. An apparatus for warming and mixing the contents of a closed container, comprising:
   an open-top housing defining a chamber for receiving a heating fluid,
   means for heating the fluid,
   a substantially planar cover for closing the top of said housing,
   container support means carried by and depending from said cover so as to be disposed within said chamber when said cover is on said housing,
   said support means including spaced opposed container gripping members mounted for oscillation about an axis substantially parallel to the plane of said cover, said container being gripped therebetween such that it may be oscillated about said axis in said chamber to impart relative motion to the container contents and to oscillate portions of the container with respect to the heating fluid in heating the contents,
   motor means mounted on said cover, and,
   linkage means connected thereto and to said container gripping members for oscillating said members and a container gripped thereby.

2. The apparatus of claim 1 wherein said support means includes two standards depending from said cover and said opposed gripping members are rotatably secured to the lower ends of said standards.

3. The apparatus of claim 2 wherein said standards carry axially aligned axles, respectively, at the lower ends thereof and said gripping members comprise a disk secured to each said axle, respectively.

4. The apparatus of claim 3 wherein one said axle is axially shiftable in its said standard, and means for axially shifting said one axle, thereby to effect gripping and releasing of the containers.

5. The apparatus of claim 4 including spring means for urging said one axle in a direction to grip a container, and shiftable cam means to urge said one axle in a direction against said spring to release a container.

6. The apparatus of claim 1 wherein said cover is provided with an aperture, and said linkage means extends through said aperture.

7. The apparatus of claim 2 wherein: said gripping members include two discs, one disc rotatably mounted with respect to each standard, each disc adapted to frictionally engage one end portion of the container.

8. The apparatus of claim 7 further including: retaining means mounted to the discs and surrounding the container end portions to restrict linear movement of the container perpendicular to the axis.

9. The apparatus of claim 8 wherein: the retaining means include a plurality of screws anchored to each disc.

10. The apparatus of claim 7 including: spring means continually biasing the discs toward engagement with the end portions.

11. The apparatus of claim 10 wherein: the spring means include a coiled spring in compression between one of the discs and its associated standard.

12. The apparatus of claim 10 including: quick release means for moving one disc away from the container in opposition to the spring means.

13. The apparatus of claim 7 wherein: the linkage means includes a crank arm mounted with respect to the shaft and extending radially outward therefrom, an elongate follower, and means pivotally connecting the follower to the crank arm and to said disc.

14. The apparatus of claim 13 wherein: the oscillatory path of said disc encompasses less than 120° of rotation.

15. The apparatus of claim 1 wherein: the container support means has a release mechanism operable to release the support means from the container.

* * * * *